W. B. FAHNESTOCK.
CAR AXLE.

No. 77,968.                     Patented May 19, 1868.

United States Patent Office.

WILLIAM B. FAHNESTOCK, OF LANCASTER, PENNSYLVANIA.

Letters Patent No. 77,968, dated May 19, 1868; antedated May 16, 1868.

---

IMPROVEMENT IN CAR-AXLES.

---

The Schedule referred to in these Letters Patent and making part of the same.

---

TO ALL WHOM IT MAY CONCERN:

Be it known that I, WILLIAM B. FAHNESTOCK, of the city of Lancaster, in the county of Lancaster, and State of Pennsylvania, have invented an Improved Independent Car-Wheel and Axle; and I do hereby declare that the following is a full and exact description thereof, reference being had to the accompanying drawings, and to the letters of reference marked thereon.

The nature of my invention consists in placing the wheels of a car on separate and independent axles, so that, in passing round a curve, the twist and strain on the axle at present in use are avoided.

To enable others skilled in the art to make and use my invention, I will proceed to describe its construction and operation.

Figure 1:
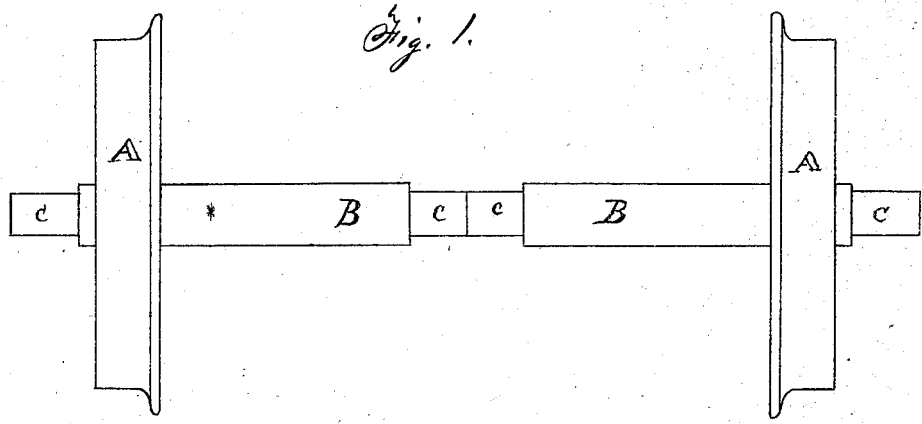
Figure 2:
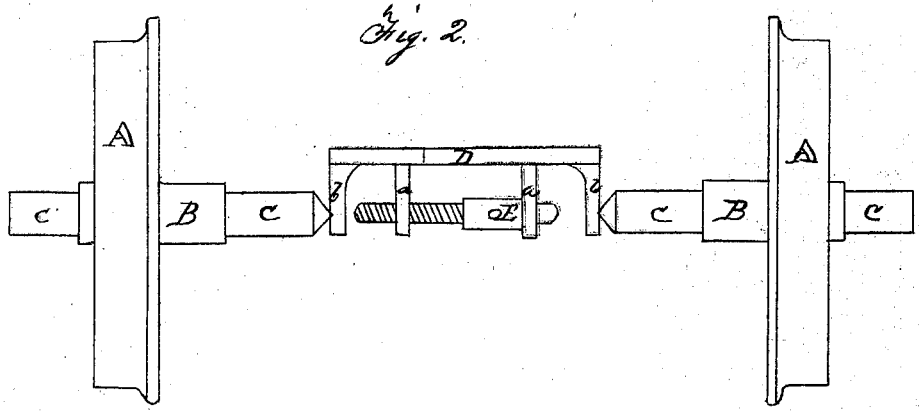

I construct my truck either of wood or iron, after any of the modes known at present, with one or more additional bearings between the wheels, and in the truck so constructed I place the wheels A A, Figure 1, which, like Figure 2, is a front view of the wheels and axles.

I construct my axles either with a bearing in the centre, at $c\ c$, fig. 1, (being in two pieces, and the ends being placed in contact with each other,) or with an intervening adjustable or stationary piece, D, placed between the ends of said axles, the object, in either case, being to prevent the wheels from coming together.

When I use an intervening piece between the ends of the axles, I arrange on the truck two inside bearings for the axles to rest in, at $c\ o,\ c\ o$, and when the piece D is not used, I employ only one, as at $c\ c$, fig. 1.

The piece D is so made that the ends $b\ b$ are kept against the pivoted ends of the axles by means of the arms $a\ a$ and screw E.

From this description of my invention it will be seen that the wheels and axles, when placed in their position on the truck, act entirely independent of each other, and yet cannot be forced nearer each other than if keyed on a single axle.

I am aware that car-axles in two pieces, united by a cylindric coupling, are not new. I therefore make no claim to this device, but What I do claim as my invention, and wish to secure by Letters Patent, is—

The plate D, constructed and operating as described, in combination with a divided axle, as specified, and for the purpose set forth.

WM. B. FAHNESTOCK.

Witnesses:
   A. V. B. ORR,
   JOHN M. AMWEG.